(12) United States Patent
Leis et al.

(10) Patent No.: US 7,477,470 B2
(45) Date of Patent: Jan. 13, 2009

(54) CONTROLLING HEAD FLYING HEIGHT BASED ON HEAD HEATER RESISTANCE

(75) Inventors: Michael Leis, Framingham, MA (US); Michael Mallary, Harmony, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 62 days.

(21) Appl. No.: 11/705,295

(22) Filed: Feb. 12, 2007

(65) Prior Publication Data

US 2007/0230020 A1 Oct. 4, 2007

Related U.S. Application Data

(60) Provisional application No. 60/743,904, filed on Mar. 29, 2006.

(51) Int. Cl.
*G11B 21/21* (2006.01)
*G11B 5/60* (2006.01)
(52) U.S. Cl. ....................................................... 360/75
(58) Field of Classification Search ....................... None
See application file for complete search history.

(56) References Cited

U.S. PATENT DOCUMENTS

| | | | |
|---|---|---|---|
| 6,262,858 B1 * | 7/2001 | Sugiyama et al. | 360/75 |
| 7,061,706 B2 * | 6/2006 | Conteras et al. | 360/75 |
| 7,068,458 B2 * | 6/2006 | Huang et al. | 360/75 |
| 7,097,110 B2 * | 8/2006 | Sheperek et al. | 360/66 |
| 7,180,692 B1 * | 2/2007 | Che et al. | 360/75 |
| 7,239,471 B2 * | 7/2007 | Tanabe | 360/75 |
| 7,301,715 B2 * | 11/2007 | Huang et al. | 360/75 |
| 7,336,434 B2 * | 2/2008 | Lille et al. | 360/75 |
| 7,375,912 B2 * | 5/2008 | Brannon et al. | 360/75 |
| 2003/0058559 A1 * | 3/2003 | Brand et al. | 360/75 |

* cited by examiner

*Primary Examiner*—Hoa T Nguyen
*Assistant Examiner*—James L Habermehl
(74) *Attorney, Agent, or Firm*—Myers Bigel Sibley & Sajovec, P.A.

(57) ABSTRACT

A fly height controller measures electrical resistance of a heater element attached to a read/write head as an indication of head temperature and associated flying height relative to a data storage disk, and responds to the measured resistance of the heater element by varying a fly height adjustment signal applied to the heater element to change the temperature of the head and its resulting flying height.

17 Claims, 3 Drawing Sheets

CONTROLLING HEAD FLYING HEIGHT BASED ON HEAD HEATER RESISTANCE

RELATED APPLICATION

This application claims the benefit of and priority to U.S. Provisional Patent Application No. 60/743,904, filed Mar. 29, 2006, the disclosure of which is hereby incorporated herein by reference as if set forth in its entirety.

FIELD

The present invention generally relates to disk drive data storage devices and, more particularly, to controlling read/write head flying height relative to a rotating disk of a disk drive.

BACKGROUND

Disk drives are digital data storage devices which allow host computers to store and retrieve large amounts of data in a fast and efficient manner. A typical disk drive includes a plurality of magnetic recording disks which are mounted to a rotatable hub of a spindle motor and rotated at a high speed. An array of read/write heads is disposed adjacent to data storage surfaces of the disks to transfer data between the disks and a host computer. The heads can be radially positioned over the disks by a rotary actuator and a closed loop servo system, and can fly in close proximity to the surfaces of the disks upon air bearings. The heads each typically contain a separate read element and write element.

Higher data storage density on the disks may be obtained by reading and writing data on narrower tracks on the disks, and by maintaining narrower flying height gaps between the heads and the data storage surfaces. Data density will vary inversely to the fly value and it is important to maintain a controlled fly height. Maintaining the head flying height within an acceptable range is becoming increasingly more difficult as that range is reduced to obtain higher data storage densities. Operation outside the acceptable range may result in an unacceptable read/write bit error rate and/or undesirable contact between a head and a data storage surface and potential loss of data and/or damage to the data storage surface.

The flying height of a head is sensitive to manufacturing tolerances and can vary in response to air density changes in the disk drive, and in response to head temperature variations which can affect the distance that the tip of the head protrudes there from (i.e., pole-tip protrusion). Some disk drives controllably heat the head using a heater to vary the flying height of the head. Typically the heater may be designed to have 'zero' heater resistance variation with temperature, but it is generally easier to have a non-zero resistance variation with temperature. The temperature coefficient (R as a function of temperature) can be easily calibrated or modeled by known methods.

SUMMARY

In some embodiments of the present invention, a circuit includes a fly height controller that measures electrical resistance of a heater element as an indication of temperature of a read/write head. The fly height controller responds to the measured resistance of the heater element by controlling a fly height adjustment signal that is applied to the heater element to control the temperature of the head.

The heater element may be attached to the head adjacent to an air gap between the head and disk and, more particularly, may be adjacent to a write element of the head so that temperature induced variations by the write element can be sensed as resistance variations in the heater element.

Some other embodiments of the present invention are directed to related methods of operating a disk drive that control heating by the heater element in response to measurements of the electrical resistance of the heater element.

DETAILED DESCRIPTION

Various embodiments of the present invention now will be described more fully hereinafter with reference to the accompanying drawings. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the terms "and/or" and "/" include any and all combinations of one or more of the associated listed items. It will be understood that, although the terms first, second, etc. may be used herein to describe various elements and/or regions, these elements and/or regions should not be limited by these terms. These terms are only used to distinguish one element/region from another element/region. Thus, a first element/region discussed below could be termed a second element/region without departing from the teachings of the present invention.

The present invention may be embodied in hardware and/or in software (including firmware, resident software, microcode, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show what may be a primary direction of communication, it is to be understood that communication may occur in the opposite direction to the depicted arrows.

Figure 1:
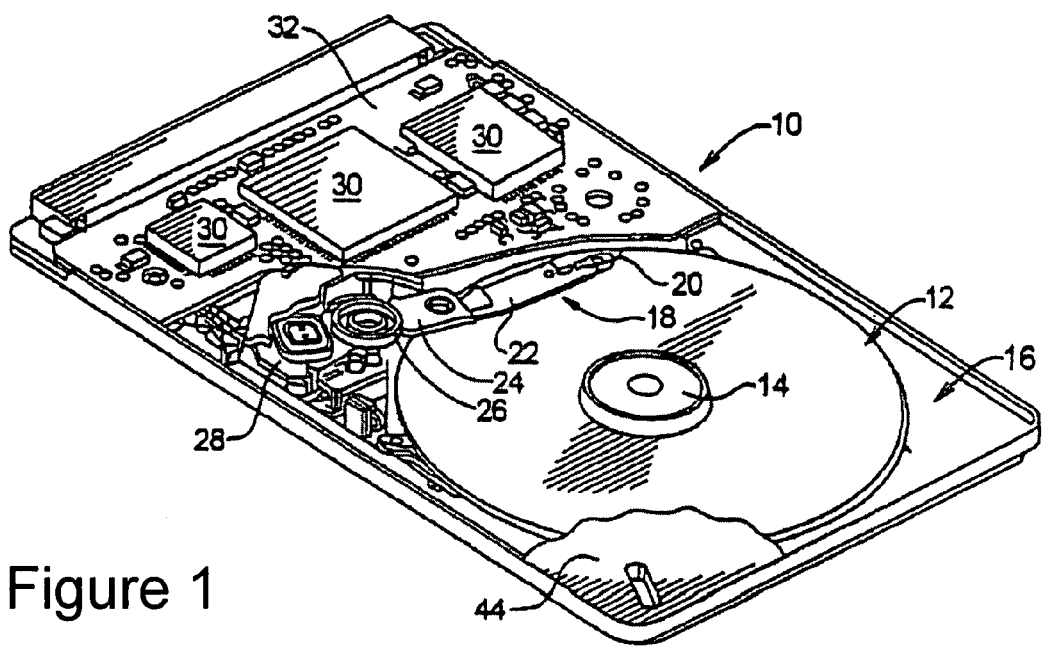
FIG. 1 is a perspective view of a disk drive with electronic circuits that are configured in accordance with some embodiments.

A simplified diagrammatic representation of a disk drive, generally designated as 10, is illustrated in FIG. 1. The disk drive 10 includes a disk stack 12 (illustrated as a single disk in FIG. 1) that is rotated by a spindle motor 14. The spindle motor 14 is mounted to a base plate 16. An actuator arm assembly 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 10.

The actuator arm assembly 18 includes a head 20 (or transducer) mounted to a flexure arm 22 which is attached to an actuator arm 24 that can rotate about a pivot bearing assembly 26. The head 20 may, for example, include a magnetoresistive (MR) element and/or a thin film inductive (TFI) element. The actuator arm assembly 18 also includes a voice coil motor (VCM) 28 which radially moves the head 20 across the disk stack 12. The spindle motor 14 and actuator arm assembly 18 are coupled to a controller, read/write channel circuits, and other associated electronic circuits 30 which are configured in accordance with at least one embodiment of the present invention, and which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

Figure 2:
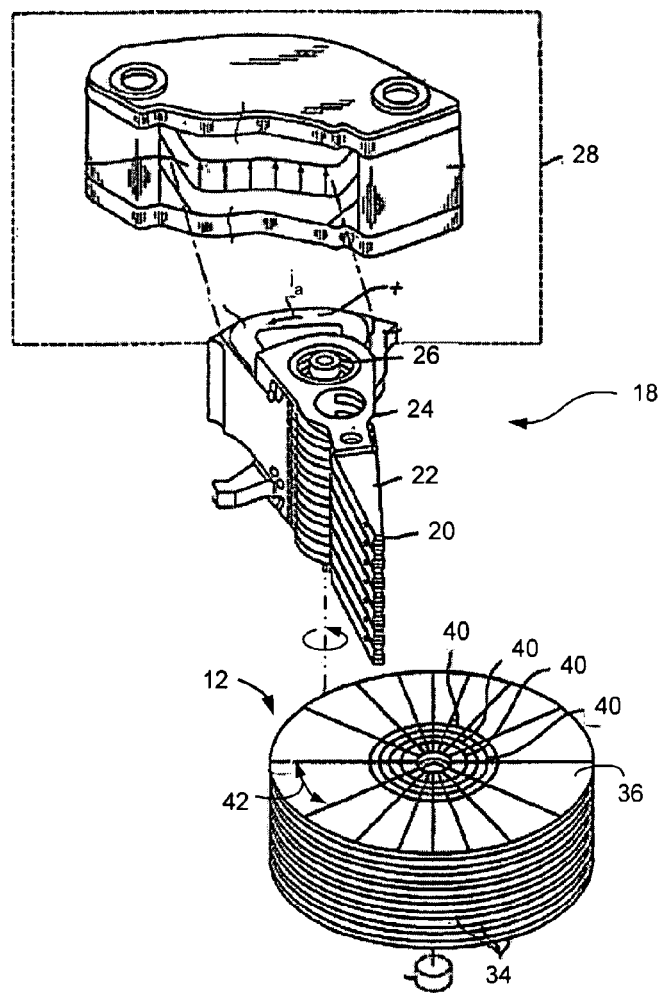
FIG. 2 is a block diagram of an exemplary head disk assembly of the disk drive.

Referring now to the illustration of FIG. 2, the disk stack 12 typically includes a plurality of disks 34, each of which may have a pair of disk surfaces 36. The disks 34 are mounted on a cylindrical shaft and are rotated about an axis by the spindle motor 14.

The actuator arm assembly 18 includes a plurality of the heads 20, each of which is positioned to be adjacent to a different one of the disk surfaces 36. Each head 20 is mounted to a corresponding one of the flexure arms 22. The VCM 28 operates to move the actuator arm 24, and thus moves the heads 20 across their respective disk surfaces 36. The heads 20 are configured to fly on an air cushion relative to the data recording surfaces 36 of the rotating disks 34 while writing data to the data recording surface responsive to a write command from a host device or while reading data from the data recording surface to generate a read signal responsive to a read command from the host device.

FIG. 2 further illustrates tracks and spokes on the disks 34. Data is stored on the disks 34 within a number of concentric tracks 40 (or cylinders). Each track 40 is divided into a plurality of radially extending sectors 42. Each sector is further divided into a servo sector and a data sector. The servo sectors of the disks 34 are used to, among other things, accurately position the head 20 so that data can be properly written onto and read from a selected one of the disks 34. The data sectors are where non-servo related data (i.e., host device data) is stored and retrieved.

Figure 3:
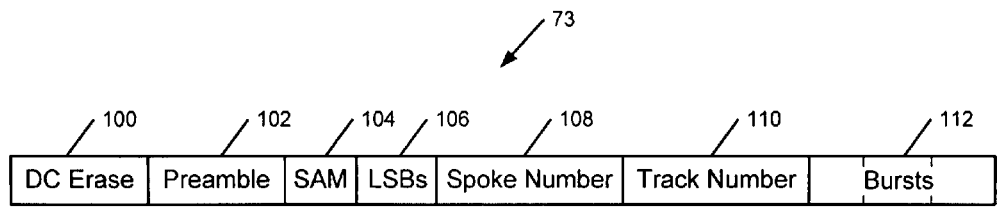
FIG. 3 is a block diagram of servo information fields in a servo sector.

FIG. 3 illustrates exemplary servo information 73 that may be stored in at least some of the servo sectors within the radial sectors 42. The servo information 73 can include a DC erase field 100, a preamble field 102, a servo address mark (SAM) field 104, a track number field indicated by its least significant bits (LSBs) 106, a spoke number field 108, an entire track number field 110 which may be recorded in at least one of the servo sectors, and a servo burst field 112 of circumferentially staggered radially offset servo bursts (e.g., A, B, C, D servo bursts).

Figure 4:
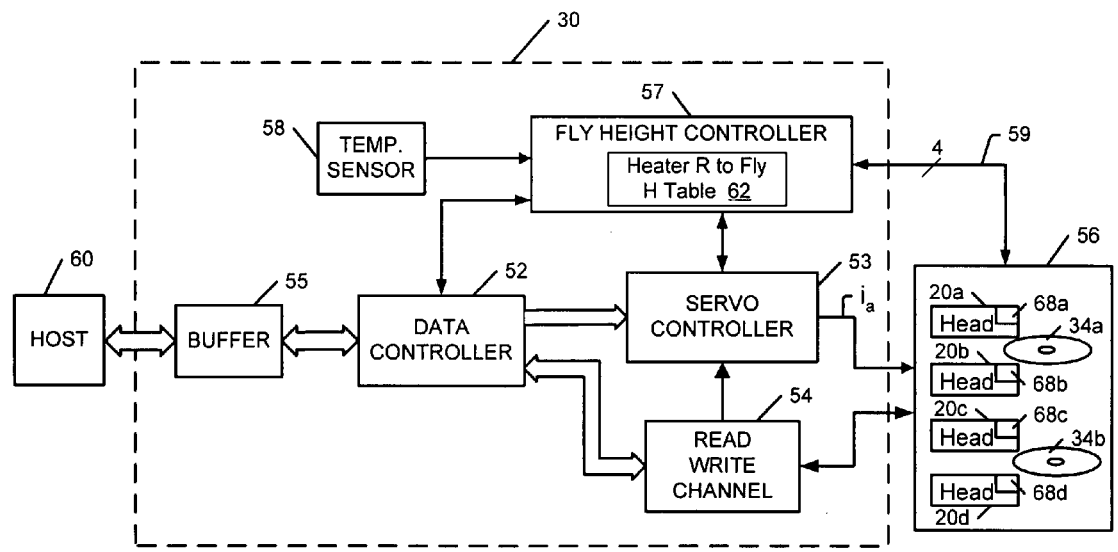
FIG. 4 is a block diagram of a portion of the controller of the disk drive shown in FIG. 1 and associated methods, and which are configured in accordance with some embodiments.

FIG. 4 is a block diagram of a host device 60 that is communicatively connected to a portion of the controller 30 of the disk drive 10 shown in FIG. 1 according to some embodiments. The controller 30 can include a data controller 52, a servo controller 53, a read write channel 54, a buffer 55, a fly height controller 57, and an optional air temperature sensor 58. Although the controllers 52, 53, and 57, the buffer 55, and the read write channel 54 have been shown as separate blocks for purposes of illustration and discussion, it is to be understood that their functionality described herein may be integrated within a common integrated circuit package or distributed among more than one integrated circuit package. The head disk assembly (HDA) 56 can include a plurality of the disks 34$a$-$b$, a plurality of the heads 20$a$-$d$ mounted to the actuator arm assembly 18 and positioned adjacent to different data storage surfaces of the disks 34$a$-$b$, the VCM 28, and the spindle motor 14.

Write commands and associated data from the host device 60 are buffered in the buffer 55. The data controller 52 is configured to carry out buffered write commands by formatting the associated data into blocks with the appropriate header information, and transferring the formatted data from the buffer 55, via the read/write channel 54, to logical block addresses (LBAs) on the disk 34 identified by the associated write command.

The read write channel 54 can operate in a conventional manner to convert data between the digital form used by the data controller 52 and the analog form conducted through the heads 20 in the HDA 56. The read write channel 54 provides servo positional information read from the HDA 56 to the servo controller 53. The servo positional information can be used to detect the location of the head 20 in relation to LBAs on the disk 34. The servo controller 53 can use LBAs from the data controller 52 and the servo positional information to seek the head 20 to an addressed track and block on the disk 34, and to maintain the head 20 aligned with the track while data is written/read on the disk 34.

The fly height controller 57 is configured to controllably heat the heads 20 to vary their flying heights relative to the data recording surfaces 36 of the disks 34. The fly height controller 57 may estimate the fly height of the heads dependent on the gas temperature at the head-disk interface and command head heating to adjust this spacing. With continuing reference to FIG. 4, the HDA 56 includes a plurality of heater elements 68$a$-$d$ attached to different ones of each of the heads 20$a$-$d$. The fly height controller 57 generates fly height adjustment signals 59 which are conducted through the heater elements 68$a$-$d$ to generate heat therefrom and, thereby, heat the heads 20$a$-$d$. The fly height controller 57 controls the height adjustment signals 59 to vary heating of the heads 20$a$-$d$ and cause a variable amount of thermally-induced elastic deformation of the heads 20$a$-$d$ and, thereby, vary the flying heights of the heads 20$a$-$d$. Although four fly height adjustment signals 59 have been shown in FIG. 4, and which may be used to separately control heating by different ones of the heater elements 68a-d, it is to be understood that more or less fly height adjustment signals 59 may be used to control the heater elements 68a-d and that, for example, the heater elements 68a-d may be controlled by a single common fly height adjustment signal 59.

As explained above, it has become increasingly important in, for example, higher data storage density disk drives to be able to measure the flying height of a head relative to a disk's data storage surface so that the head flying height may be maintained within an acceptable range. In accordance with some embodiments of the present invention, the heater elements 68a-d includes a material having an electrical resistance that varies with temperature. The fly height controller 57 is configured to measure the electrical resistance of one or more of the heater elements 68a-d and to use the measured resistance as an indication of temperature of the respective heads 20a-d and indirectly, the flying height of the heads 20a-d relative to the disks 34a-b. The fly height controller 57 varies the fly height adjustment signals 59 in response to the resistance measured for one or more of the heater elements 68a-d to change the temperature of the heads 20a-d and their resulting flying heights over the disks 34a-b.

The heater elements 68a-d may be attached to a portion of the heads 20a-d that is adjacent to the air gap between the heads 20a-d and disks 34a-b, which may allow more accurate temperature sensing of a relevant portion of the heads 20a-d that is elastically deformed in response to temperature. When the heads 20a-d each include a separate read element and write element (e.g., a TFI element), the heater elements 68a-d may be attached adjacent to the write element to enable more accurate sensing of the write element temperature, which may provide a more sensitive indication of flying height fluctuations due to variable heating and associated deformation of the write element as a result of write currents and write duty cycles.

The temperature sensor 58 generates a temperature signal that is indicative of temperature within the disk drive 10, such as the ambient air temperature in the disk drive 10 which is indicative of air density in the air gap between the flying heads 20a-d and disks 34a-b. The fly height controller 57 may estimate the flying height of the heads 20a-d based on the temperature signal from the temperature sensor 58.

As an alternative or in addition to the use of the sensor 58, direct measurement of the air temperature in the gaps between the flying heads 20a-d and the disks 34a-b may be carried out by measuring the resistances of heaters 68a-d while, for example, not applying write power or significant heater power (time share, method as an example). Accordingly, the fly height controller 57 may generate a temperature signal that is indicative of the air temperature in the gaps between the flying heads 20a-d based on measurement of the resistance of one or more of the heaters 68a-d.

The use of sensing heater resistance while writing could eliminate or minimize the complexity of monitoring the head temperature due to write power and may reduce or eliminate the need to track write duty cycle and write power levels.

The fly height controller 57 may include a table 62 that associates heater resistance with estimated head fly height. The values in the table 62 may be calibrated by measuring the resistance of one or more of the heaters 68a-d, at various different head temperatures, and the corresponding actual fly height of the heads 20a-d. The number of calibrated values that may be included in the table 62 may be based on the relative linearity/non-linearity of the relationship between changes in the resistance of the heaters 68a-d and the associated fly heights of the heads 20a-d, with more calibrated values needed in the table 62 for more non-linear relationships. The fly height controller 57 may use the measurement of the resistance of one or more of the heater elements 68a-d, and may further use the signal from the air temperature sensor 58, as a pointer to obtain an estimate of the flying heights of one or more of the heads 20a-d. The fly height controller 57 may adjust the head flying heights by varying the fly height adjustment signals 59 (e.g., by varying voltage/current level) to vary temperature of the heater elements 68a-d. Accordingly, the fly height controller 57 may use the table 62 to obtain an estimate of the fly height of the heads 20a-d in response to the measured resistance of one or more of the heater elements 68a-d, and may control the flying height of the heads 20a-d in response to the estimated fly heights.

The fly height controller 57 may measure and calibrate the flying heights of the heads 20a-d by positioning the heads 20a-d to read at least a portion of a reference track on the disks 34a-b and to generate reference read signals therefrom, and estimating the head flying heights based on the amplitude of the corresponding reference read signals. The fly height controller 57 may calibrate the values in the table 62 in response to the fly height measurements and associated measurements of the resistance of the heaters 68a-d.

The fly height controller 57 may measure the electrical resistances of each of the heater elements 68a-d, and separately vary a corresponding one of the fly height adjustment signals 59 to vary the temperature of a corresponding one of the heater elements 68a-d in response to the measured resistance thereof. Accordingly, the flying height of each of the heads 20a-d may be separately varied in response to the measured resistance of the associated one of the heater elements 68a-d.

Alternatively, the fly height controller 57 may measure the electrical resistances of each of the heater elements 68a-d, and may combine, such as by averaging, the measured electrical resistances into a combined electrical resistance measurement. The fly height controller 57 may then vary the fly height adjustment signals 59 applied to each of the heater elements 68a-d in response to the combined electrical resistance measurement. Accordingly, the flying heights of the heads 20a-d may be collectively varied in response to a combined electrical resistance measurement for the heater elements 68a-d. Alternatively, the flying heights of the heads 20a-d may be controlled based on a single heater measurement.

The fly height controller 57 may determine the resistance of the heater elements 68a-d based on measurements of the voltage and/or current applied to the heater elements 68a-d.

Figure 5:
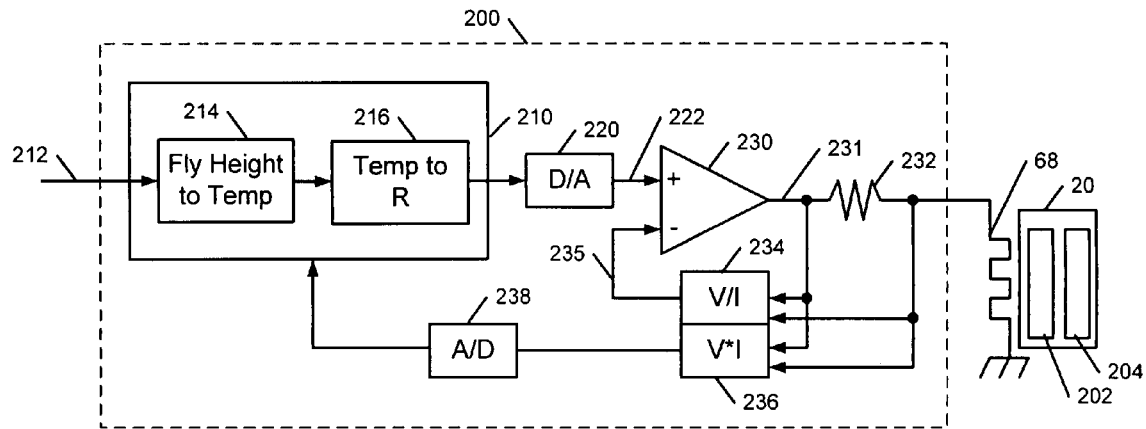
FIG. 5 is a schematic diagram of a fly height controller and associated continuous time methods configured in accordance with some embodiments.

In some embodiments, the voltage and current of one or more of the fly height adjustment signals 59 are measured while optionally a write signal is being conducted through one or more of the heads 20a-d to write data on the disk(s) 34a-b. FIG. 5 is a schematic diagram of a fly height controller 200 and associated methods that may be used in the fly height controller 57 of FIG. 4, and which is configured to measure resistance of the heater element 68 while the head 20 is used to write data. The head 20 is illustrated with a write element 202 (e.g., a TFI element) and a read element 204 (e.g., a MR element). The heater element 68 is attached to the head 20 adjacent to the write element 202 so that the temperature of the heater element 68 closely corresponds to the temperature of the write element 202. Because the write element 202 can undergo significant temperature variation during write cycles and corresponding thermo-induced elastic deformation, positioning the heater element 68 adjacent to the write element 202 may allow a higher correlation between write element 202 temperature variation and resistance variation in the heater element 68.

The fly height controller 200 may include a command signal generating circuit 210 that responds to a fly height signal 212 that is indicative of a needed change in the head fly height. The circuit 210 may include a first control circuit 214 and a second control circuit 216. The first control circuit 214 may convert the fly height signal 212 into a reference head temperature signal which is indicative of a temperature at which the head 20 is expected to have the desired head fly height relative to the disk 34. The second control circuit 216 may convert the reference head temperature signal into a corresponding reference resistance signal, which is indicative of a resistance that the heater element 68 will have when then head 20 is heated to the reference head temperature. This second control circuit 216 can be modified to account for various non-linearity in the circuits 200 and the heater elements 68. A digital-to-analog converter (D/A) 220 converts the reference resistance signal into a heating command signal 222. A differential amplifier 230 generates at an output a fly height adjustment signal 231 in response to differences between the heating command signal 222 and a feedback signal 235. At least one resistive element 232 (e.g., a resistor) may be connected in series between the output of the differential amplifier 230 and the heater element 68 to enable sensing of current applied to the heater element 68.

The feedback signal 235 may be generated in response to a voltage drop across the resistive element 232. Because the resistive element 232 can have a known resistance value, a resistance measurement circuit 234 may measure the voltage across the resistive element 232 and determine the current through the resistive element 232 based on Ohms law that current (I) is equal to voltage (V) divided by resistance (R). Because the resistive element 232 and the heater element 68 are connected in series, the determined current through the resistive element 232 is the same current level that flows through the heater element 68. Accordingly, the resistance measurement circuit 234 may determine the resistance of the heater element 68 based on the ratio of determined current through the resistive element 232 and the voltage level of the fly height adjustment signal 231, and may generate the feedback signal 235 so that it is indicative of the resistance of the heater element 68. Other circuit design techniques may used instead of a sense resistor 232 to sense current flows to the heater, for example, use of current mirrors. Thus, the differential amplifier 230 may use the feedback signal 235 to vary the fly height adjustment signal 231 so that the resistance of the heater element 68 tracks the heating command signal 222, and so that the head 20 temperature. Lead and lag control may be applied to the illustrated control operations using well known control design techniques.

The fly height controller 200 may further include a power measurement circuit 236 which may measure the power applied to the heater element 68 based on voltage level of the fly height adjustment signal 231 multiplied by the current conducted through the heater element 68. An analog-to-digital converter (A/D) 238 may convert the measured power into a power signal provided to the command signal generating circuit 210, where it may be used to adjust (e.g., calibrate) the conversions carried out by the first and/or second control circuits 214/216.

Figure 6:
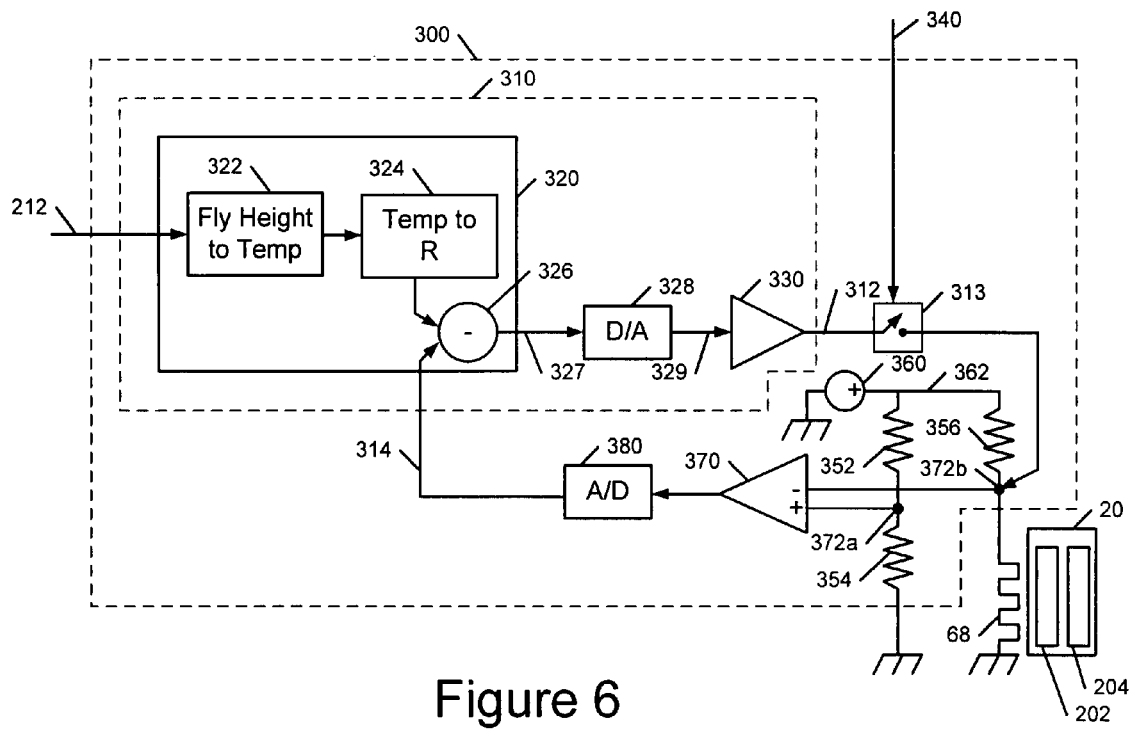
FIG. 6 is a schematic diagram of a fly height controller and associated time share methods configured in accordance with some other embodiments.

In some other embodiments, the resistance of the heater element 68 is measured while the heater element 68 is not being heating. FIG. 6 is a schematic diagram of other methods and another fly height controller 300 that may be used in the fly height controller 57 of FIG. 4.

The fly height controller 300 may include a fly height adjustment circuit 310 that is configured to generate a fly height adjustment signal 312, and to vary the fly height adjustment signal 312 in response to a resistance measurement signal 314 that is indicative of the resistance of the heater element 68. The fly height adjustment circuit 310 may include a command signal generating circuit 320 that responds to a fly height signal 212, which may be the same fly height signal 212 illustrated in FIG. 5, and which is indicative of a desired head fly height. The circuit 320 may include a first control circuit 322 and a second control circuit 324, which may be configured as described above with regard to the respective first and second control circuits 214 and 216. A reference resistance signal from the second control circuit 324 is combined with the resistance measurement signal 314 at a difference node 326 to generate a resistance error signal 327 which is converted by a D/A converter 328 into an analog resistance error signal 329. The analog resistance error signal 329 is amplified by an amplifier 330 to generate a fly height adjustment signal 312 which is selectively conducted through a switch 313 in response to a heater switch signal 340. When the switch 360 is open there will be no drive to the heater element 68 and the resistance of the heater element 68 may be directly measured.

Under command of the heater switch signal 340 the switch 313 is closed with a duty cycle to apply the fly height adjustment signal 312 to the heater element 68 so that the temperature of the head 20 can be varied to control the flying height of the head 20. When the switch is open (off duty cycle) the heater 68 resistance may be measured. The off period of this switch will be long enough to allow electrical noise to settle away, and the resistance measurement to be made.

The heater element 68 may form part of a Wheatstone resistive bridge circuit that further includes a first resistive element 352, a second resistive element 354, and a third resistive element 356. A voltage source 360 (AC or DC) generates a test signal 362 having a defined voltage level. The first and second resistive elements 352,354 are connected in series between the test signal 362 and a common voltage (e.g., ground voltage). Similarly, the third resistive element 356 and the heater element 68 are connected in series between the test signal 362 and the common voltage. A differential amplifier 370 generates the resistance measurement signal 314 in response to a voltage difference between a first node 372a between the first and second resistive elements 352,354 and a second node 372b between the third resistive element 356 and the heater element 68 in response to the test signal 362 from the voltage source 360. The second node 372b may be electrically connected to receive the fly height adjustment signal 312 when the switch 313 is closed. The resistance measurement signal 314 may be converted to a digital signal by an A/D converter 380, or fedback as an analog signal 235 as shown in FIG. 5

The circuits 200 and 300 may be used to selectively measure and control the fly height of a plurality of heads by time multiplexing among the heads, or the circuits 200 and 300 may be replicated and configured to measure and control the fly height of individual heads.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A circuit comprising:
a fly height controller that measures electrical resistance of a plurality of heater elements each connected to a different one of a plurality of read/write heads, estimates the temperature of each head in response to the associated resistance measurement and combines the temperature estimates of the measured plurality of heater elements into a combined temperature measurement, and responds to the combined temperature measurement by controlling the fly height adjustment signals applied to the heater elements to change the temperatures of the heads and their resulting flying heights.

2. The circuit of claim 1, wherein the heater element has an electrical resistance that varies in response to temperature of the head.

3. The circuit of claim 2, wherein the fly height controller measures voltage and/or current in the fly height adjustment signal applied to the heater element, and determines resistance of the heater element in response to the measured voltage and/or current in the fly height adjustment signal.

4. The circuit of claim 3, wherein the fly height controller measures voltage and current in the fly height adjustment signal applied to the heater element while a write signal is being conducted through the head to write data on the disk.

5. The circuit of claim 2, wherein the fly height controller comprises:
a command signal generator circuit that generates a heating command signal;
a differential amplifier that generates the fly height adjustment signal at an output in response to differences between the heating command signal and a feedback signal; and
at least one current measurement element that measures current from the output of the differential amplifier to the heater element, and at least one voltage measurement element across the heater element wherein the feedback signal is generated in response to the measured current and voltage.

6. The circuit of claim 5, wherein the at least one current measurement element comprises:
at least one resistive circuit element connected between the output of the differential amplifier and the heater element, and at least one voltage measurement element across the heater element wherein the feedback signal is generated in response to a voltage across the at least one resistive circuit element and voltage across the heater element.

7. The circuit of claim 2, wherein the fly height controller comprises:
a voltage source generating a signal having the reference voltage level;
a resistive bridge circuit comprising first, second, and third resistive elements and the heater element as another resistive element, wherein the first and second resistive elements are connected in series between the signal having the reference voltage level from the voltage source and a common voltage, wherein the third resistive element and the heater element are connected in series between the signal having the reference voltage level from the voltage source and the common voltage; and
a differential amplifier that generates a resistance measurement signal, which is indicative of resistance of the heater element, in response to a voltage difference between a first node between the first and second resistive elements and a second node between the third resistive element and the heater element.

8. The circuit of claim 1, wherein the fly height controller averages the measured estimated temperature of the measured plurality of heater elements to generate the combined temperature measurement, and responds to the combined temperature measurement by varying the fly height adjustment signals applied to the heater elements to change the temperatures of the heads and their resulting flying heights.

9. A circuit comprising:
a fly height controller that controls fly height adjustment signals applied to a plurality of heater elements, which are each connected to a different one of a plurality of read/write heads, to change the temperatures of the heads and their resulting flying heights in response to a measured electrical resistance of a selected one of the plurality of heater elements.

10. A circuit comprising:
a fly height controller that measures electrical resistance of a heater element as an indication of temperature of a read/write head, and responds to the measured resistance of the heater element by controlling a fly height adjustment signal that is applied to the heater element to heat the head, wherein the fly height controller comprises a table of reference heater element resistances and corresponding reference head fly adjustment values, and the fly height controller uses the measured resistance of the heater element as a pointer to identify one of the reference heater element resistances in the table and identifies a corresponding one of the reference head fly height adjustment values, and varies the fly height adjustment signal applied to the heater element in response to the identified reference heater element resistance.

11. The circuit of claim 10, wherein the fly height controller estimates the flying height of the head by controlling the head to read at least a portion of a reference track on the disk to generate a reference read signal, and estimates the head fly height based on the amplitude of the reference read signal, and varies the fly height adjustment signal applied to the heater element based on a combination of the head fly height estimated from the reference read signal and the reference head fly height retrieved from the table.

12. A circuit comprising:
a controller that measures electrical resistance of a heater element attached to a read/write head and generates an air temperature signal that is indicative of air temperature in a gap between the head flying relative to the disk in response the measured electrical resistance of the heater element.

13. The circuit of claim 12, wherein:
the heater element has an electrical resistance that varies in response to temperature of the attached head; and
the controller measures voltage and/or current in a heater signal applied to the heater element, and determines resistance of the heater element in response to the measured voltage and/or current in the heater signal.

14. A method of controlling a heater element that heats a read/write head flying adjacent to a rotating data storage disk responsive to a fly height adjustment signal, the method comprising:
measuring electrical resistance of the heater element as an indication of head temperature; and
determining air temperature in a gap between the head flying relative to the disk in response to the measured resistance of the heater element.

15. The method of claim 14, further comprising:
varying the fly height adjustment signal applied to the heater element to change the temperature of the head in response to the measured resistance of the heater element.

16. The method of claim 14, wherein measuring electrical resistance of the heater element as an indication of head temperature comprises:
measuring current through the heater element;
measuring voltage across the heater element; and
determining the electrical resistance of the heater element in response to the measured current and voltage.

17. The method of claim 14, wherein measuring electrical resistance of the heater element as an indication of head temperature and associated flying height relative to the disk comprises:
conducting the fly height adjustment signal through at least one resistive circuit element having a known resistance and connected in series with the heater element;
sensing a voltage across the at least one resistive element;
measuring voltage across the heater element; and
measuring the resistance of the heater element in response to the sensed voltages.

\* \* \* \* \*